Figures 1, 2:
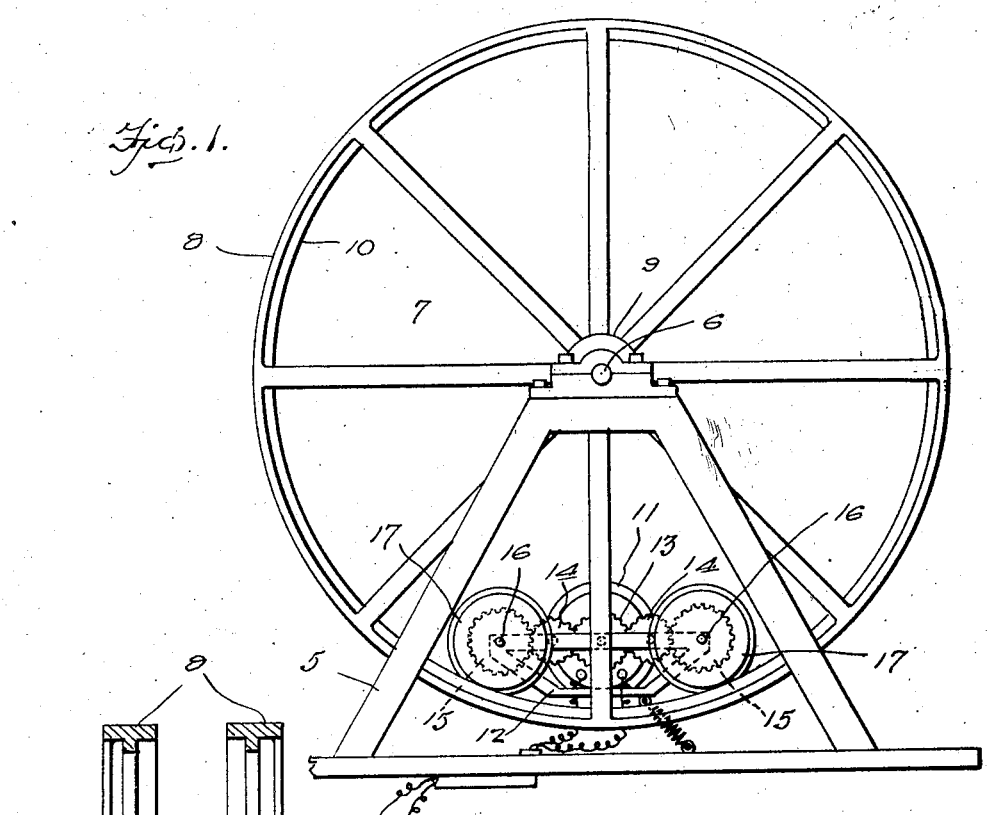

Aug. 16, 1927.

J. W. DEROCHE 1,639,260

POWER TRANSMITTING MECHANISM

Filed Oct. 1, 1926

Inventor

J. W. Deroche

By Clarence A. O'Brien

Attorney

Patented Aug. 16, 1927.

1,639,260

UNITED STATES PATENT OFFICE.

JOSEPH W. DEROCHE, OF SANFORD, MAINE.

POWER-TRANSMITTING MECHANISM.

Application filed October 1, 1926. Serial No. 139,008.

This invention relates to new and useful improvements in power mechanism and has for its primary object to provide such a device that embodies certain novel and peculiar features in the details of construction as well as the relative disposition of parts hereinafter more clearly set forth, illustrated in the drawing, and set forth in the appended claims.

A further object of the invention is to provide a mechanism for operating very heavy machinery at a uniform low rate of speed with the least expenditure of power in operating the invention and also to provide a device in which the several elements are compactly arranged and assembled.

Other objects and advantages will become apparent as the nature of the invention is better understood, the same comprising the novel form, combination and arrangement of parts hereinafter more fully described, shown in the accompanying drawing and claimed.

In the accompanying drawings wherein like numerals indicate like parts throughout:

Figure 1 is a side elevation of a power transmitting mechanism constructed in accordance with the present invention, Fig. 2 is a detailed vertical section thereof.

Now having particular reference to the drawing, my novel mechanism constitutes the provision of a suitable supporting frame 5 journaled through bearings upon the upper ends of which is a power take-off shaft 6. Keyed to this shaft within said frame 5 is a power wheel 7 consisting of a pair of spaced rims 8—8 interconnected at their centers by a hub 9. The inner faces of these rims are formed with rails 10—10 as more clearly indicated in Fig. 2.

Mounted within the wheel for operating the same is a power device consisting of an electric motor 11 mounted upon a suitable frame 12 that is arranged between the rims 8—8 of the wheel as also clearly indicated in Fig. 2. The opposite ends of the armature shaft within the motor are equipped with bearing gears 13—13 of predetermined size, said bearing gears being in mesh with smaller bearing gears 14—14 at the front and rear thereof and opposite sides of the motor, said last-mentioned gears 14—14 being respectively in mesh with still further gears 15—15 upon the opposite ends of axles 16—16 journaled transversely across the opposite ends of the frame 12 and upon the outer ends of which are flanged wheels 17—17 disposed upon the rails 10—10 of the respective wheel rims 8—8.

For preventing the movement of the power means around the interior of the wheel rim said spring 12 is anchored to the frame 8 by means of a pair of coiled springs 18—18 that are attached to the frame 8 and to the power device frame respectively.

The motor 11 is to be placed in circuit with a suitable source of electric energy and when the circuit to the motor is completed, the wheels 17 will be caused to rotate in the same direction obviously rotating the wheel around said power device which rotation of the wheel will be imparted to the shaft 6 from which the power may be taken in a desirable manner.

It will be seen that I have provided a highly novel, simple and efficient form of power transmitting mechanism that is well adapted for all of the purposes heretofore designated. Even though I have herein shown and described the invention as consisting of certain detailed structural elements, it is nevertheless to be understood that some changes may be made therein without affecting the spirit or scope of the appended claims.

Having thus described my invention, what I claim as new and desire to secure by Letters Patent is:

1. In a power transmitting mechanism of the character described, a supporting frame, a shaft mounted for rotation upon the frame, a pair of rims, a hub keyed to the shaft and to which said pair of rims are connected, said rims being in spaced relation to each other, rails provided on the inner faces of the rims, a power embodying means for said rim, said means consisting of an electrical motor, a frame for supporting said electric motor, traction wheels at opposite sides of the motor frame at the front and rear ends thereof in tractional driving relation with the rails, and driving connections between the traction wheels and the electric motor.

2. In a power transmitting mechanism of the character described, a supporting frame, a shaft mounted for rotation upon the frame, a pair of rims, an elongated hub geared to the shaft, and to which the said rims are connected, said rims being in spaced relation to each other, rails provided on the inner faces of the rims, a power imparting means for said rims, said means consisting of an electric motor, a frame for supporting said electric motor, traction wheels at the opposite sides of the frame at the front and rear walls thereof in tractional driving relation with the rails, driving connections between said traction wheels and the electric motor, and resilient means for limiting the movement of the power imparting device, within the power rims.

In testimony whereof I affix my signature.

JOSEPH W. DEROCHE.